United States Patent [19]
Aral et al.

[11] Patent Number: 5,906,804
[45] Date of Patent: May 25, 1999

[54] MAGNESIUM HYDROXIDE SLURRIES

[75] Inventors: Halil Aral, Elwood; Martin Richard Houchin, Pascoe Vale; Phillip Robin Strode, Bundoora; Robert Van Merkestein, St. Kilda; Philip Bush, Kenmore Hills, all of Australia

[73] Assignee: Orica Australia Pty, Ltd., Melbourne, Australia

[21] Appl. No.: 08/765,457

[22] PCT Filed: Jul. 24, 1995

[86] PCT No.: PCT/AU95/00446

§ 371 Date: Jan. 23, 1997

§ 102(e) Date: Jan. 23, 1997

[87] PCT Pub. No.: WO96/03346

PCT Pub. Date: Feb. 8, 1996

[30] Foreign Application Priority Data

Jul. 25, 1994 [AU] Australia ............................. PM7059
Dec. 22, 1994 [AU] Australia ............................. PN0270

[51] Int. Cl.⁶ .................. C01F 5/14; B01J 13/00
[52] U.S. Cl. .................. 423/265; 423/635; 423/636; 423/637; 576/88
[58] Field of Search .................. 252/313.1; 423/636, 423/635, 637, 265, 640; 516/88; 106/800

[56] References Cited

U.S. PATENT DOCUMENTS

| 2,193,281 | 3/1940 | Hall . | |
|---|---|---|---|
| 3,692,898 | 9/1972 | Gorman et al. | 424/158 |
| 3,957,674 | 5/1976 | Sano et al. | 252/182 |
| 5,183,648 | 2/1993 | Wolfert | 423/267 |
| 5,487,879 | 1/1996 | Witkowski et al. | 423/155 |

FOREIGN PATENT DOCUMENTS

| 109835 | 2/1940 | Australia . |
|---|---|---|
| 48765/93 | 4/1994 | Australia . |
| 2687396 | 8/1993 | France . |

OTHER PUBLICATIONS

87–011677/02, Nov. 29, 1986, Derwent Abstract, JP,A, 61–270214 (Shin Nippon Kagaku).
87/052782/08, Jan. 1987, Derwent Absstract, JP, A, 62–007439 (Katayama Kagaku KOG).
89/188315/26, May 18, 1989, Derwent Abstract, JP, A, 63–277511 (Shin Nippon Kagaku).
89/002317/01, Nov. 15, 1988, Derwent Abstract, Class A60, JP, A, 63–277511 (Shin Nippon Kagaku).
93–297709, Aug. 1993, Derwent Abstract, JP,A,5–208810 (Rohm and Haas Company).
81–91984, Nov. 2, 1981, Derwent Abstracts, JP, A, 56–140025 (Mitsui Mining & Smelting).

*Primary Examiner*—Richard D. Lovering
*Attorney, Agent, or Firm*—Oblon, Spivak, McClelland, Maier & Neustadt, P.C.

[57] ABSTRACT

Magnesium hydroxide slurries having the following characteristics: (i) having a solids content of between 40–80 wt. % based on the weight of the slurry with the balance being water; (ii) containing between 0.01–5.0 wt.% of at least one viscosity modifying agent or dispersant based on the weight of the slurry selected from the following groups: (1) inorganic acids having a molecular weight less than 130 amu and their inorganic salts excluding $H_2SO_4$, $H_3PO_4$, silicic acid and salts having an alkali metal as sole cation; (2) low molecular weight (i.e. less than 200 amu) carboxylic acids optionally containing one or more hydroxyl groups and their inorganic salts excluding salts having alkali metal as sole cation; (3) polyhydric alcohols or carbohydrates containing two or more hydroxyl groups and having a molecular weight less than 500 amu; and (4) alkaline earth oxides and/or hydroxides; (v) being sedimentation stable for at least seven days without substantial agitation; and (vi) maintaining a viscosity of less than 1000 cP at a shear rate of 139 $sec^{-1}$ over a period of at least seven days.

39 Claims, 7 Drawing Sheets

|--- 2 μm ---|

MAGNESIUM HYDROXIDE SLURRIES

This application is a 371 of PCT/AU95/00446 filed Jul. 24, 1995.

FIELD OF THE INVENTION

This invention relates to magnesium hydroxide slurries and is particularly concerned with high solids content, stable, pumpable magnesium hydroxide slurries and processes for production of such magnesium hydroxide slurries.

BACKGROUND OF THE INVENTION

Magnesium hydroxide slurries may be produced from magnesia (MgO) as a feed stock. Magnesia may be obtained from the natural mineral magnesite ($MgCO_3$) or from sea water or brine. Production of magnesium hydroxide from magnesite generally involves calcination to decompose $MgCO_3$ to MgO with subsequent hydration in water to convert MgO to $Mg(OH)_2$. The production of magnesium hydroxide from sea water or brine entails direct precipitation with quicklime (CaO) or more preferably with dolime or dolomitic lime. Commercially this is usually a precursor to the production of "synthetic magnesia" by subsequent calcination of the precipitated magnesium hydroxide. The sea water is seeded with magnesium hydroxide to promote crystal growth and to improve settling and filtering characteristics of the magnesium hydroxide precipitate. A flocculating agent is also usually added. The resulting thickened slurry is vacuum-filtered to produce a filter cake containing about 50% magnesium hydroxide. Because nearly all the magnesium hydroxide produced in this way is presently calcined to MgO, the characteristics of the magnesium hydroxide precipitate are optimised for solid/liquid separation rather than for magnesium hydroxide production.

Conventional magnesium hydroxide slurries may be utilised for desirable applications which include:
(a) use in relation to treatment of industrial effluent or waste water;
(b) use as a commercial alkali for pH control;
(c) flue gas desulphurisation; and
(d) use of adsorptive properties of magnesium hydroxide to remove inorganic or organic contaminants.

In this context magnesium hydroxide slurries are preferred for use in applications such as (a) (b) (c) and (d) above rather than magnesia either to avoid complications that uncontrolled hydration can cause, such as heat generation and cement formation, or because conversion of MgO to $Mg(OH)_2$ is essential to the desired application. In this regard magnesia in its reactive form in an aqueous environment will become hydrated to $Mg(OH)_2$ relatively spontaneously and in some cases it is desirable to control the rate of hydration dependent upon the desired application.

Magnesia in its reactive form commonly known as caustic magnesia, caustic calcined magnesite or light burned magnesia has to be distinguished from a relatively inert form of magnesia known as dead burned or inert magnesia.

None of the commercially produced magnesium hydroxide slurries which have a relatively high solids content (i.e. 50–60 wt %) have been found to have a combination of high solids content, stability to settling and high overall reactivity which are characteristics of magnesium hydroxide slurries produced by the present invention as hereinafter described. It is common practice in some conventional slurries, as referred to in prior art hereinafter, to incorporate a polymeric viscosity modifying agent to thin and/or stabilise the slurry but this practice has undesirable side effects as described hereinafter.

Reference also may be made to conventional processes for producing magnesium hydroxide slurries which are described in the following patent specifications:

(a) JP 5-279017 and JP 5-279018 which describe a hydration process of light burned magnesia which is introduced into a hydration tank equipped with a stirrer or agitator and which is simultaneously milled by steel balls or other form of abrading apparatus;

(b) JP-2-48414 which refers to a process of producing magnesium hydroxide as a hexagonal plate like crystal having a specific surface area (SSA) of $10m^2/g$ or less. A slurry of $Mg(OH)_2$ having a solids content of 5–70% wt % is formed as an intermediate in a hydration process at above 50° C. under agitation and some slurry is periodically removed and replaced by hot water and magnesia to obtain a uniform slurry density. This slurry is used for producing high purity dry $Mg(OH)_2$ used for flame retardant applications;

(c) JP-01-212214 refers to a method of manufacture of magnesium hydroxide wherein magnesia having a mean particle diameter of less than 100 micron is hydrated in the presence of alkali metal ions and/or alkaline earth metal ions and also in the presence of the hydroxide ion, nitrate ion, carbonate ion, chloride ion and/or sulphate ion. The magnesia is initially calcined between 400–850° C. before being pulverised. A slurry is formed having 10–50% wt % $Mg(OH)_2$;

(d) JP 3-252311 refers to a process for preparing "active" magnesium hydroxide wherein light burnt magnesia is obtained by calcining a natural magnesite at 850–1100° C. and subsequently grinding the magnesia to a mean particle size of 5–10 micron and then subjecting the ultra-fine powder in an "acidic reaction" to obtain active magnesium hydroxide;

(e) Bron et al., Chemical Abstracts (CA) 68(2): 5884e (1966) refers to the hydration of magnesite derived MgO. Magnesium hydroxide was produced during boiling or short wet grinding of the MgO with water in a ball mill and had a characteristic brucite structure consisting of hexagonal laminar crystals;

(f) JP 54150395 which refers to production of magnesium hydroxide slurry by grinding dried magnesium hydroxide to a specified particle size and then mixing with water under agitation;

(g) EP 0599085 which refers to an apparatus and method for the production of active magnesium hydroxide. In this specification coarse light burned magnesia is comminuted in the wet state with a wet-pulveriser and hydrated in the presence of an alkaline aqueous medium which included sodium hydroxide at an elevated temperature of not less than 70° C. The resultant pulverised material is classified into fine and coarse particles using a classifying means which is generally set to restrict the passage of particles in excess of 20 micron. Subsequently the coarse particles are recycled to the wet-pulveriser. By subjecting light burned magnesia to concurrent wet-pulverisation and hydration in the presence of a heated alkaline aqueous medium, magnesia can be simultaneously comminuted and hydrated under rapid heating to produce an active magnesium hydroxide showing a low viscosity even at a high concentration;

(h) KR 9301256 which describes formation of active magnesium hydrate made from light burned magnesite which is subjected to wet crushing with water, an alkali stabiliser inclusive of sodium hydroxide and dispersing agent inclusive of polycarboxylate using reaction heat and crushing heat;

(i) DD 272288 which describes hydration of MgO resulting from $MgCl_2$ thermal decomposition which is carried out by (a) pre-hydrating MgO in one or more series or parallel connected hydration reactors; and (b) grinding in one or more series or parallel connected hydration reactors; and (j) JP 03-60774 which refers to the production of magnesium hydroxide slurries which includes the step of slaking finely pulverised light burnt magnesia which is obtained by firing naturally produced magnesite with water with heating to 85–100° C. Sodium hydroxide is added as a hydration accelerator.

It is known from JP 5-208810 and JP 3-252311, for example, that magnesia may be produced by calcination of magnesite followed by particle reduction to obtain ultra-fine particles having a mean particle size of 5–10 micron which is then hydrated to form a magnesium hydroxide slurry. The hydration process can be carried out in a particle reduction zone.

It is also known to add viscosity modifying agents or dispersants to the slurry to control viscosity or dispersability of the end product. Such viscosity modifying agents or dispersants can include. decomposable phosphates (see FR 2399485); carboxylic acid type polymeric surfactants (see JP 5-208810); polyanion and anion of strong acids such as HCl, $H_2SO_3$ or $H_2SO_4$ (see DE 4302539); polymeric anion dispersant and water soluble alkali metal salt (AU 48785/93); sulphomethylated acrylamide homopolymers or copolymers (see U.S. Pat. No. 4,743,396); alkaline salts of a sulfosuccinic ester product (see DE 3323730); alkali metal silicate and hydroxide and/or mineral acid salts (see J62007439); organic or inorganic dispersants (see J61270214); xanthan gum and lignin sulphonates (see CA 110 (10):7837e); carboxymethylcellulose (see CA 104 (6):39729k); cationic polymers (see U.S. Pat. No. 4,430, 248); ferrous hydroxide or aluminium hydroxide (see CA 79(8):44013S) and polyacrylates (see U.S. Pat. No. 4,230, 610).

It is also known to use additives to accelerate the hydration of MgO to $Mg(OH)_2$ and/or to modify the crystal shape of the magnesium hydroxide product during hydration. Such additives include citric acid or magnesium chloride (see CA 110(24):215623f), short chain carboxylic acids or corresponding salts such as magnesium acetate (see JP 3-197315, JP 01-131022 and DD 280745), ammonium chloride (see DD 241247); magnesium chloride, magnesium acetate, magnesium sulphate or magnesium nitrate (see DD 246971); inorganic or organic acids such as HCl or acetic acid or their magnesium salts such as magnesium chloride, or magnesium acetate (see CA111(18):159019n), proprionic acid (see JP 63-277510), n-butyric acid (see JP 63-277511), and sodium hydroxide (see JP 03-60774).

In particular, reference should be made to JP-3-197315, which refers to the production of a magnesium hydroxide slurry having 3–70 wt % and more preferably 20–50 wt % solids as an intermediate in the production of magnesium hydroxide crystals having hexagonal plate-like crystals which are obtained as a final product of the hydration of magnesia. These crystals are utilised as a fire retardant. JP-1-131022, which is discussed in the prior art preamble of JP-3-197315, states that the purpose of addition of magnesium salts such as magnesium acetate or organic acids such as acetic acid, is for controlling the rate of hydration or for controlling the growth of magnesium hydroxide crystals. The crystals that are obtained by the hydration process of this reference are regular in shape thereby avoiding the formation of agglomerates.

In general, desirable properties that magnesium hydroxide slurries should possess include:

(A) high-solids-content, to allow high reaction capacity per unit (weight or volume) of slurry;

(B) high reactivity;

(C) stability to both settling and ageing; and (D) low viscosity to enable the slurry to be transported, sprayed, coated, (slip) cast and/or dosed by conventional pumping techniques.

The solids content of a magnesium hydroxide slurry is ultimately limited by its viscosity, which in turn is influenced by the particle size, shape, porosity, the number of particles, and the strength and nature of the particle-particle interactions and the particle-carrier interactions (in the present case, the carrier being water). In general, the greater the number of particles (and therefore interactions) and the greater the attractive nature of the interactions, the higher the viscosity and the lower the solids content achievable.

The reactivity is influenced by the surface area and particle size, with smaller particle sizes and higher surface areas favouring higher reactivity.

Stability to settling is mainly a function of particle size, with smaller particles giving greater suspension stability in the absence of viscosity modifiers.

Stability to ageing (i.e. no significant change in physical properties especially viscosity) appears to be related to the degree of hydration of the magnesia. It is known that substantially full hydration (i.e. greater than 98%) of MgO is difficult to achieve simply by suspending MgO in water. When MgO is hydrated in aqueous suspension, $Mg(OH)_2$ crystals tend to form on the surface of the MgO particles, thereby restricting access of water to the unhydrated MgO surface. As a consequence, the rate of hydration becomes progressively slower and a non-homogenous product can result. The properties of the product can vary with time, as the degree of hydration slowly increases. When the magnesium hydroxide is precipitated from sea-water, the product is, naturally, completely hydrated.

The aforementioned prior art refers to the use of additives including an alkali metal cation. It has now been established in experimental work referred to hereinafter that such additives, in particular sodium hydroxide, sodium acetate, sodium carbonate, sodium silicate and sodium chloride result in immediate thickening of untreated slurries or have no effect on the slurry and thus such additives are unsuitable for use as viscosity modifying agents.

It has also been established that the use of polymeric viscosity modifying agents, such as polyacrylates, have undesirable side effects in use. One side effect is that addition of a polyacrylate has the effect of first thickening the slurry to a paste and subsequently thinning the slurry following further addition of polyacrylate. The formation of a paste may cause a problem in an industrial slurry production process. Once a paste has been formed, it would be difficult to mix in further quantities of polyacrylate to fluidise the paste. Another side effect is that following addition of polyacrylate, the slurries were less reactive than the untreated slurries without polyacrylate. Another side effect is the propensity of some polymers to precipitate at low pH.

SUMMARY OF THE INVENTION

It is therefore an object of the invention to provide magnesium hydroxide slurries which are stable, pumpable, and which have a high solids content which are commercially effective in use.

It is a further object of the invention to provide processes for such slurries.

Surprisingly, it has now been discovered that magnesium hydroxide slurries having the abovementioned properties may now be produced by the addition of one or more viscosity modifying agents as described hereinafter which were not previously known for this purpose. The addition of such viscosity modifying agents provide such slurries with both sedimentation stability and viscosity stability over time. Both of these characteristics are not interdependent and the production of slurries having both these stability characteristics by the addition of the viscosity modifying agents could not have been predicted from the prior art.

Therefore, in one aspect of the present invention there are provided magnesium hydroxide slurries having the following characteristics:

(i) having a solids content of between 40–80 wt % based on the weight of the slurry with the balance being water;

(ii) containing between 0.01–5.0 wt % of at least one viscosity modifying agent or dispersant based on the weight of the slurry selected from the following groups:

(1) inorganic acids having a molecular weight less than 130 amu and their inorganic salts excluding $H_2SO_4$, $H_3PO_4$, silicic acid and salts having an alkali metal as sole cation;

(2) low molecular weight (i.e. less than 200 amu) carboxylic acids optionally containing one or more hydroxyl groups and their inorganic salts excluding salts having alkali metal as sole cation;

(3) polyhydric alcohols or carbohydrates containing two or more hydroxyl groups and having a molecular weight less than 500 amu; and (4) alkaline earth oxides and/or hydroxides;

(iii) being sedimentation stable for at least 7 days without substantial agitation; and (iv) maintaining a viscosity of less than 1000 cP at a shear rate of 139 sec$^{-1}$ over a period of at least seven days.

Preferably such slurries contain particle agglomerates of crystals wherein the agglomerates have a mean particle size of between 2–50 micron and wherein individual crystals included in said agglomerates have an upper limit in regard to average crystal dimension of 0.2 micron as determined by X-Ray Diffraction Line Broadening. More preferably, such crystals are of irregular shape.

Preferably the agglomerates have a $d_{50}$ greater than 3 micron and more preferably greater than 6 micron and the individual crystals are less than 0.1 micron and more preferably have a size of about 0.05 micron.

Preferably the solids content is greater than 60 wt % and is suitably between 60–70 wt %.

Preferably the total amount of $Mg(OH)_2$ plus $Ca(OH)_2$ included in the slurry has a value greater than 40 wt %.

The amount of solids other than $Mg(OH)_2$ included in the slurries of the invention is preferably less than 10 wt %.

The amount of viscosity modifying agent (VMA) or dispersant may preferably be between 0.05 and 3.0 wt %. The VMA is selected from groups (1) to (4) above.

Such VMAs, alone or in combination, have been shown to be effective in achieving the required stability characteristics of slurries of the invention. Such VMAs are also less expensive than polymeric species. Use of such VMAs also does not suffer from disadvantages such as initial slurry thickening, reduced slurry activity and precipitation of polymer under certain conditions as referred to above in the discussion of the prior art.

Effective viscosity modifying agents in group (1) include, for example, HCl, $HNO_3$, $HClO_4$ aluminium, ferric, magnesium, calcium and barium salts. Examples of effective members of group (2) include formic acid, acetic acid, propionic acid and butyric acid and their salts. Such salts may include calcium acetate and magnesium acetate. Effective viscosity modifying agents in group (3) include, for example, mannitol, mono-,di- and trisaccharides such as sucrose and lactose and waste products containing sugar-based compounds.

Calcium oxide and/or hydroxide are preferred in group (4).

Preferred VMAs of group (1) are magnesium salts which are soluble in the slurry carrier which is typically water. With magnesium oxide or hydroxide having a significant calcium impurity, which is typical of caustic magnesia prepared from magnesite, it may also be preferred that the viscosity modifying agent's calcium salt also be soluble.

The aforementioned groups (1) to (4) are suitably all low molecular weight (<~500 amu) and preferably do not contain phosphate, silicate or sulphonate functional groups. The most common and cheapest, and among the most effective VMAs for achievement of the required stability characteristics, are hydrochloric acid (and magnesium chloride), acetic acid (and magnesium acetate), sucrose and calcium hydroxide.

Two or more viscosity modifying agents may be selected from separate groups (1) to (4).

If only a viscosity modifying agent prom group (1) is selected, the slurry is preferably completely hydrated, i.e. substantially does not include residual unhydrated magnesium oxide. If this condition is not met, the slurry will be useful but will be less than optimum because it is found that the initially thin slurry thickens over a period of days or weeks.

Viscosity modifying agents from group (3) may be employed alone but then require higher dosage rates than when used in combination with a group (1) or (2) agent, and are also more effective if alone if the slurry is more than 95% hydrated. This degree of hydration is readily achieved in aqueous caustic magnesia suspensions at temperatures above 60° C.

The dosage rate for the viscosity modifying reagent, or for the viscosity modifying reagents collectively if more than one is selected, is preferably chosen so as to optimise effectiveness at minimum cost, and depends on the reagent used.

It will generally be understood that the selection of a viscosity modifying agent or agents, and the dosage rate, may require empirical enquiry and will depend on the nature of the feed material, having regard to the general requirement for economic optimisation. It will typically be preferred to minimise the residual amount of viscosity modifying agent and to have regard to the intended application of the slurry and whether, or the extent to which, each possible viscosity modifying agent at each possible dosage might be a contaminant with reference to the intended application, or might interfere with one or more downstream processes. The optimal dosage might be determined by simple stepwise addition of agent.

The viscosity of the magnesium hydroxide slurries of the invention are preferably less than 300 cP and most preferably less than 100 cP.

The stability characteristics of the slurry are best defined in terms of observed settling rates for a particular particle size distribution as well as a particular VMA which may be utilised. A settling rate of less than 5% of total slurry volume in 30 days with less than 1% sediment has been found to be particularly appropriate using the test procedure described below. This was achieved with a grind of 90% passing (i.e. $d_{90}$) 30 microns and 50% passing ($d_{50}$) 10 microns. It is likely that coarser grinds can be used to produce slurries with similar settling characteristics.

A suitable test for measuring the volume percentage of sediment, or settled bed, in a slurry is to place 200 cm³ of slurry in a measuring cylinder, wait the prescribed period time, and then slowly lower a steel cylinder (2 cm diameter×4 cm height) weighing 100 g into the slurry and measure the level at which any sediment present will support the weight of the cylinder. The volume of sediment so defined is expressed as a percentage (by volume) of the total slurry volume.

The slurries of the invention preferably develop a yield stress (i.e. gel) but may be refluidised with minimal agitation. Such gelling characteristic may be demonstrated by inverting a container containing the slurry without the slurry flowing out of the inverted container as described hereinafter. Preferably magnesium hydroxide slurries of the invention will also be stable to ageing in that the viscosity of the slurry does not increase to a value greater than 1000 cP at a shear rate of 139 sec$^{-1}$ over a period of 14 days and more preferably 30 days. Most preferably the viscosity stays below 1000 cP at a shear rate of 139 sec$^{-1}$ indefinitely.

It is considered that magnesium hydroxide slurries of the invention will substantially conform to the abovementioned criteria (A), (B), (C) and (D). Preferably slurries of the invention exclude polymeric viscosity modifying agents.

Magnesium hydroxide slurries of the invention may be prepared by any suitable process. In one form, an hydration step may be carried out by hydrating magnesium oxide at elevated temperature i.e. 50100° C. and over a time span of 0.5–5 hours.

The magnesium hydroxide slurries of the invention may be obtained from any suitable MgO or magnesium hydroxide feedstock including seawater or brine. However the preferred form of magnesium oxide for use as feedstock is the form commonly known as caustic magnesia, usually produced by calcining a suitable magnesium compound, e.g. magnesium carbonate at a temperature below 1200° C.

Preferably the feed stock is formed from calcined magnesia obtained from magnesite. Such feed stock may have a SSA (specific surface area) of between 1–200 m²/g and more suitably 10–60 m²/g. The feedstock may also contain from 0.5–5% CaO content.

Unlike crystal modifiers and hydration accelerators as described above, which must be present during hydration of magnesium oxide to be effective, the VMAs utilised in the present invention are not so restricted. In contrast, the VMAs of the invention may (with the exception of lime which should be added after hydration), be added to a magnesia suspension before hydration, or during hydration, or may be added to the magnesium hydroxide suspension between hydration and particle size reduction eg milling, or during particle size reduction or after particle size reduction, depending on the agent or agents used. It is found that in some cases addition of the viscosity modifying agent(s) before milling may increase the efficiency of the milling process. In some cases, addition of the viscosity modifying agent before hydration increases the efficiency of the hydration process. The hydration and particle size reduction processes can be performed simultaneously, for example in a ball mill. The process can be performed batchwise, or on a continuous basis.

Two particularly preferred processes for preparing magnesium hydroxide slurries in accordance with the invention are described below. One process is suitable for fine magnesia particles and the other process is suitable for magnesia particles which are relatively coarse.

In accordance with a second aspect of the invention therefore there is provided a process for producing a magnesium hydroxide slurry including the steps of:

(i) subjecting calcined magnesia of a particle size of about or less than 25 mm to a first particle reduction zone wherein said calcined magnesia is mixed with water and ground;

(ii) passing said finely divided material through a screening means to ensure passage therethrough of finely divided magnesia having a particle size of about 2 mm or less and returning oversize magnesia particles to said first reduction zone;

(iii) hydrating said finely divided magnesia in a hydration zone wherein said finely divided magnesia is mixed with water under agitation and heat so as to produce a magnesium hydroxide slurry having at least 80% hydration;

(iv) passing said slurry though a second particle reduction zone so as to produce slurry particles wherein 90% of said slurry particles have a size of less than 50 microns;

(v) adding a viscosity modifying agent selected from groups (1), (2), (3) and (4) prior to or during steps (i), (ii), (iii) or (iv) so as to ensure a maximum viscosity of 1000 cP; and (vi) obtaining after step (v) as a final product stable, pumpable, magnesium hydroxide slurries having a solids content of at least 40%.

Preferably, the slurry particles obtained from step (iv) are recycled back to the second particle reduction zone in a loop or back to the hydration zone which may also function as a holding tank.

In accordance with a third aspect of the invention there is provided a process for producing a magnesium hydroxide slurry including the steps of:

(i) continuously feeding magnesia to a hydration zone wherein the slurry is subjected to continual agitation;

(ii) hydrating said magnesia in the hydration zone under agitation and heat so as to produce a magnesium hydroxide slurry having at least 80% hydration;

(iii) adding a viscosity modifying agent selected from groups (1), (2), (3) and (4) prior to or during steps (i), (ii) or (iii) so as to ensure a maximum viscosity of 1000 cP; and (iv) obtaining as a final product stable, pumpable magnesium hydroxide slurries having a solids content of at least 40%.

Preferably after step (ii) the slurry is passed through a particle reduction zone so as to produce slurry particles wherein 90% of said slurry particles have a size of less than 50 microns.

Subsequently, the slurry particles obtained after passage through the particle reduction zone are recycled back to the particle reduction zone in a loop or back to the hydration zone which may also function as a holding tank.

In accordance with a preferred form of the above described third aspect of the invention, the viscosity modifying agent may be added to the slurry after hydration or when the slurry has become relatively thick in the hydration zone.

After passage through the particle reduction zone in the third aspect, the thin slurry may be transferred to a holding zone which is in communication with the particle reduction zone and the slurry may be continuously circulated between the holding zone and the particle reduction zone.

In a fourth aspect of the invention, there is provided a process for producing a stable, pumpable slurry of magnesium hydroxide comprising adding to a slurry of magnesium hydroxide a viscosity modifying agent selected from a group consisting of the following groups:

(1) inorganic acids having a molecular weight less than 130 amu and their inorganic salts excluding $H_2SO_4$, $H_3PO_4$, silicic acid and salts having an alkali metal as sole cation;

(2) low molecular weight (i.e. less than 200 amu) carboxylic acids optionally containing one or more hydroxyl groups and their inorganic salts excluding salts having alkali metal as sole cation;

(3) polyhydric alcohols or carbohydrates containing two or more hydroxyl groups and having a molecular weight less than 500 amu; and (4) alkaline earth oxides and/or hydroxides.

BRIEF DESCRIPTION OF THE DRAWINGS

Reference may now be made to a preferred embodiment of the invention as shown in the attached drawings, wherein.

DETAILED DESCRIPTION

Figure 1:
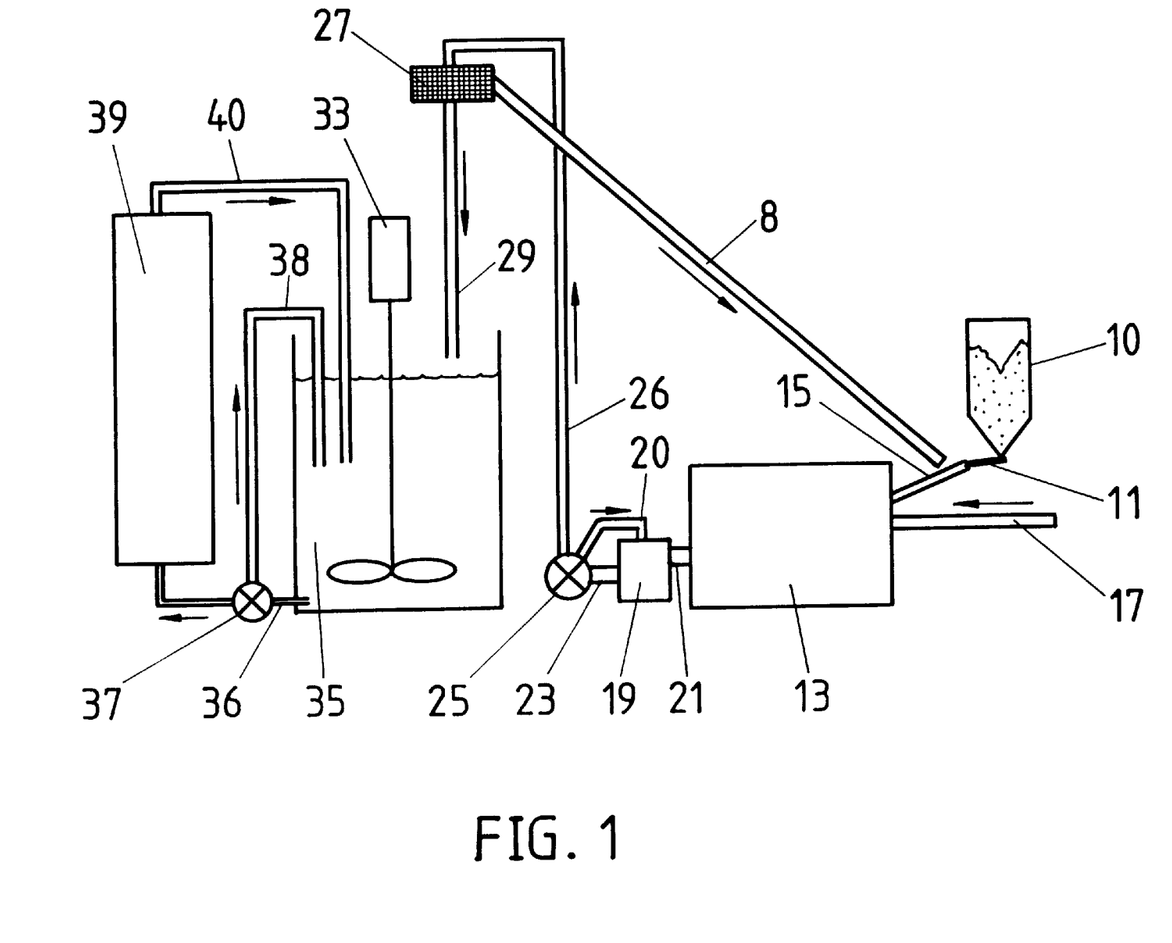
FIG. 1 is an illustration of one embodiment of exemplary apparatus or plant which may be utilised in regard to manufacture of magnesium hydroxide slurries of the invention.

The plant as shown in FIG. 1 comprises an MgO feed hopper 10, vibrating feeder 11, ball mill 13, feed conduits 17 and 15 for water and MgO respectively, conduit 21 interconnecting sump 19 and ball mill 13, conduit 23 interconnecting pump 25 and sump 19, return conduit 20 from pump 25 to sump 19, conduit 26 between pump 25 and screen 27, conduit 29 between screen 27 and hydration tank 35, stirrer assembly 33, conduit 36 interconnecting pump 37 and attrition mill 39 to hydration tank 35, return conduit 38 between pump 37 and hydration tank 35 and return conduit 40 between attrition mill 39 and hydration tank 35. The plant shown in FIG. 1 was designed to produce approximately 1000 L of slurry per slurry batch.

MgO was fed into the ball mill 13 via a vibrating feeder 11. Water was also added to the mill via line 17 to form a magnesia slurry within the ball mill 13. The ball mill had an internal diameter of 0.65 m and a length of 0.95 m, giving it a total volume of approximately 315 L, and a working volume of approximately 130 L. It was charged with approximately 82 L of steel balls and therefore had a capacity of approximately 48 L for slurry. The rate of MgO addition was variable and, as such, was manually adjusted according to the density of the $MgO/H_2O$ slurry discharged. The ball mill was generally rotated at 33 rpm. The ball mill discharge was collected in a sump 19, the contents of which was transferred to the screen assembly 27 fitted with a 1000 μm screen. Oversize material was returned to the ball mill feed through conduit 8 whilst undersize material was routed to the hydration reactor holding tank 35.

The hydration tank/holding tank 35 was a steel, essentially flat-bottomed tank fitted with baffles (not shown) and a stirrer 33. It had an internal diameter of 1.22 m, and a height of 1.55 m, giving it an effective working volume of approximately 1500 L. The top of the stirrer-blade was approximately 0.45 m from the bottom of the tank. Heat to the tank 35 was supplied via a 15 kW immersion heater (not shown). The pump 37 was connected to the base of the hydration tank 35, to allow slurry to be recirculated and/or transferred to the attrition mill 39.

The attrition mill 39, a model C20 Attritor consisted of a large steel frame in which a cigar shaped grinding chamber was vertically suspended. An impellor (not shown), a shaft with steel pins protruding, created a bed a moving steel balls through which the slurry was pumped. The grinding chamber of the attrition mill used had a total volume of approximately 106 L. Upon the addition of 400 kg of grinding media, the effective volume of the attritor was reduced to approximately 54 L. Slurry was pumped from the hydration tank/holding tank 35, through the attrition mill 39 and then returned to the hydration tank/holding tank 35. Note that the attrition mill 39 inlet was situated at the bottom of the mill and thus discharged from the top. Slurry held in the hydration tank/holding tank 35 was cycled through the attrition mill 39 until bulk slurry particle size distribution targets were achieved.

After final processing, the slurry was transported off site in approximately 1000 L containers.

Figure 2:
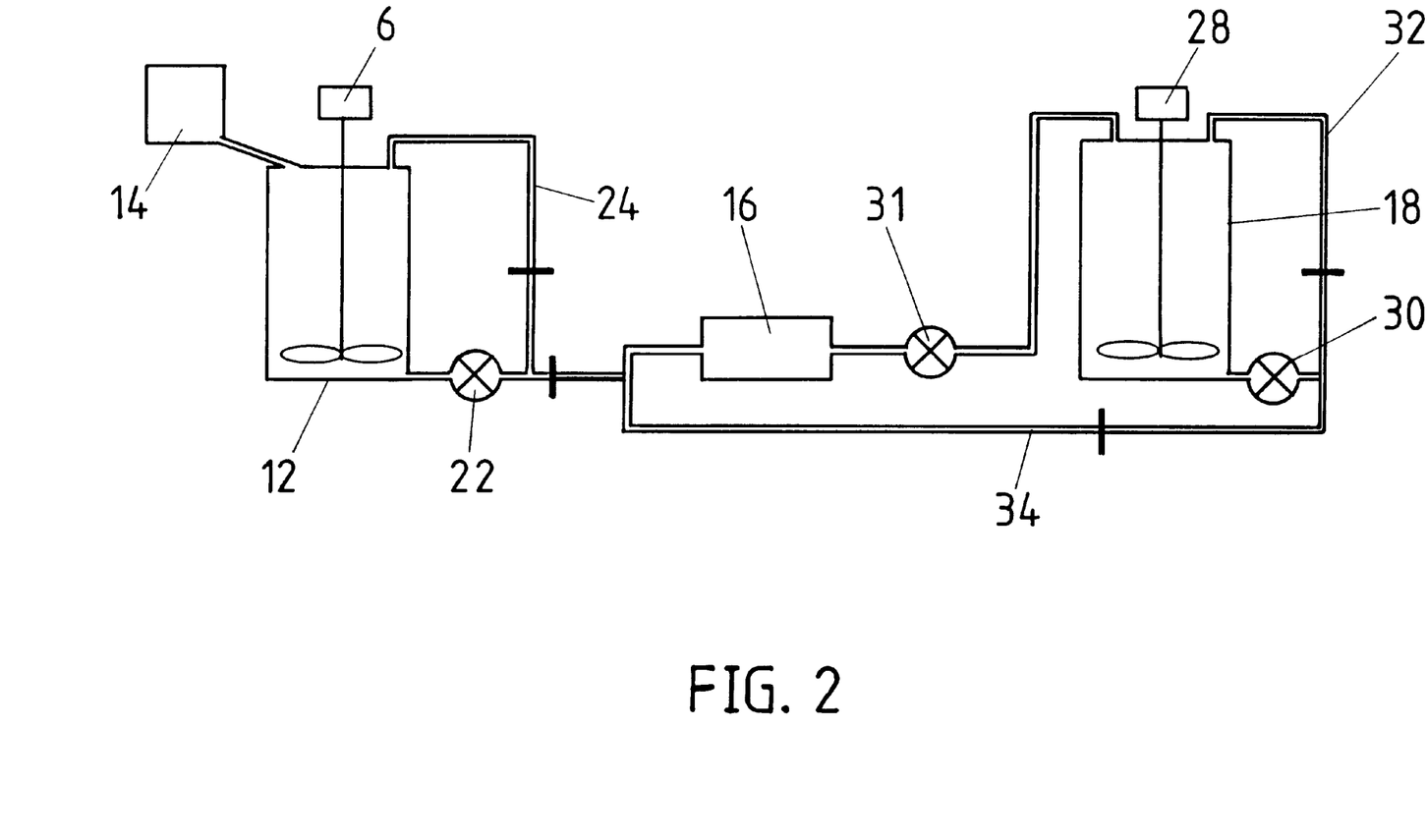
FIG. 2 is an illustration of another embodiment of apparatus or plant which may be utilised in regard to manufacture of magnesium hydroxide slurries of the invention.

The attached drawing as shown in FIG. 2 depicts a suitable plant for carrying out a preferred embodiment of the method of the third aspect of the invention. The plant consists of a hydration reactor 12, fed by a vibrating feeder 14, a ball mill 16 and a holding tank 18.

The hydration tank 12 was a stainless steel, essentially flat-bottomed tank fitted with baffles and a stirrer 6. It had an effective working volume of 1500 L. MgO was fed to the top of the tank via the vibrating feeder 14. A pump 22 was connected to the base of the hydration tank, to allow slurry to be either recirculated via circuit 24 or transferred to other units.

An exemplary ball mill 16 had a total volume of 315 L, and a working volume of 130 L. It was charged with steel balls, leaving an effective slurry capacity of 50 L. It was fed by pump 22 such that the slurry had a residence time of 5 min/cycle. The discharge from the mill 16 was transferred to the holding tank 18 by the use of pump 31.

The slurry holding tank 18 had an effective capacity of 1500 L. It was fitted with baffles, a stirrer 28 and pump 30. The pump 30 was used to recirculate the slurry either directly via line 32, or via line 34 and the ball mill 16.

In operation, water in the hydration tank was heated to at least 60° C. prior to addition of MgO. The water was stirred and recirculated via the pump 30. Stirring and pumping were continued throughout the hydration process.

Figure 3:
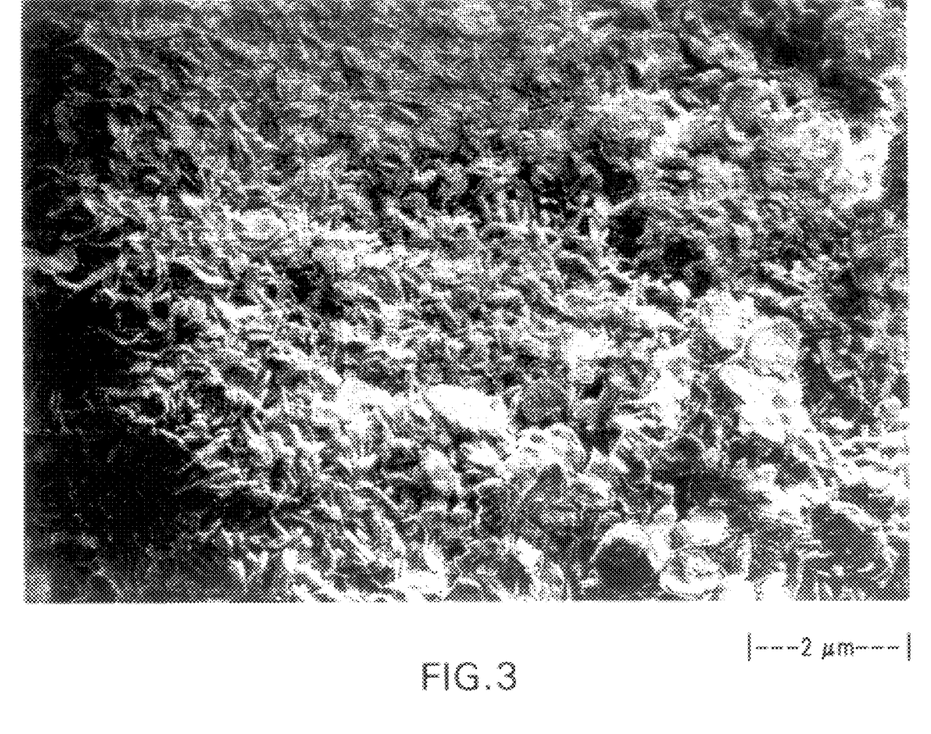
FIG. 3 is a photomicrograph (×10,000) of a commercially produced magnesium hydroxide slurry.
Figure 4:
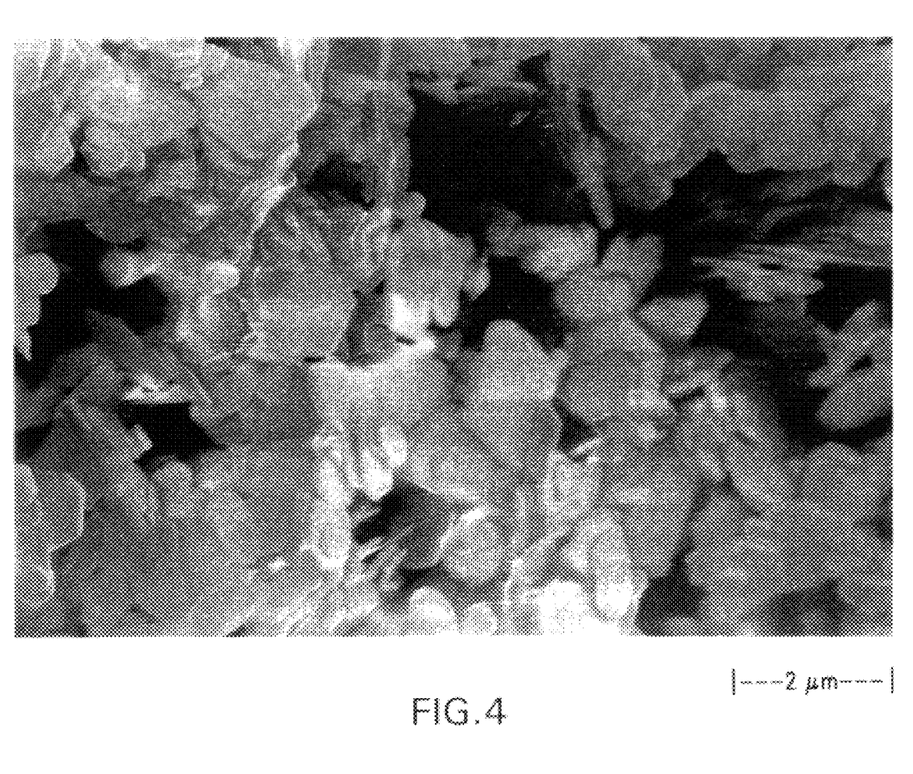
FIG. 4 is a photomicrograph (×10,000) of a flame retardant grade commercially produced magnesium hydroxide slurry.
Figure 5:
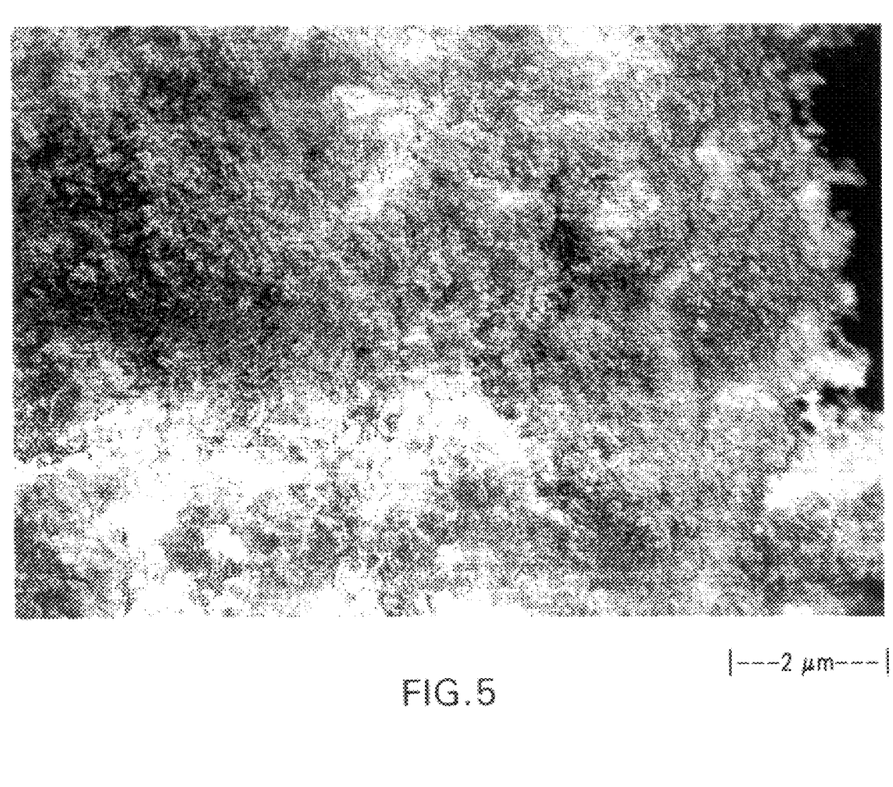
FIG. 5 is a photomicrograph (×10,000) of a magnesium hydroxide slurry of the invention.
Figure 6:
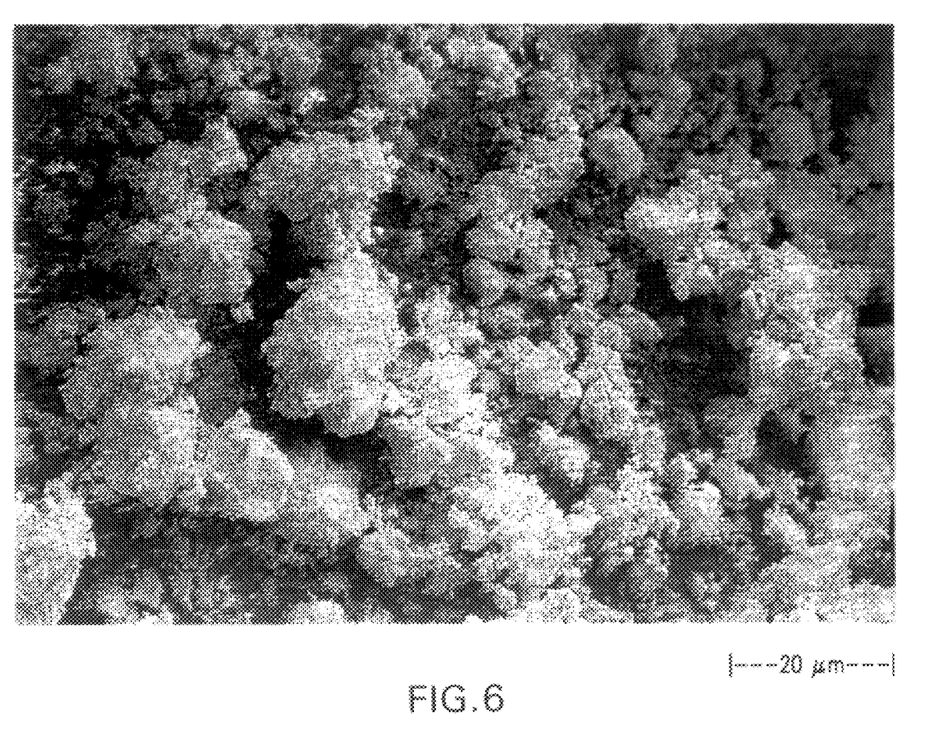
FIG. 6 is a similar photomicrograph to FIG. 5 but at a 1,000 magnification.

FIGS. 3–6 are included in the specification to illustrate the preferred morphological characteristics (i.e. being in the form of agglomerates of crystals having a mean particle size as discussed above). Thus FIGS. 3–4 illustrate prior art magnesium hydroxide slurries and FIGS. 5–6 illustrate magnesium hydroxide slurries of the present invention which are produced by the procedures referred to in Example 1 or Example 2 hereinafter.

The invention, in its various aspects, is further described and illustrated by the following non-limiting examples.

EXAMPLE 1

A 60 wt % $Mg(OH)_2$ slurry was prepared in the laboratory by adding the required amount of MgO powder (nominally <100 $\mu$m) to a stirred volume of water initially at 85° C. The resulting slurry boiled due to the heat released by the hydration reaction. After 1 h the slurry was transferred to a ball mill and ground (for 1 h) to a particle size of $d_{50}$=9.5 $\mu$m. The degree of hydration (% MgO converted to $Mg(OH)_2$) was 96%.

The following combinations of viscosity modifying agents were added to split samples of the above slurry (% dosage rates based on weight of slurry surface):

1. no reagents added;
2. 0.4% (c)HCl;
3. 0.4% (c)HCl plus 0.5% sucrose;
4. 0.2% acetic acid;
5. 0.2% acetic acid plus 0.5% sucrose.

Four days after preparation, the viscosities of the above samples at a shear rate of 139 $sec^{-1}$ were as follows:

1. 1140 cP;
2. 437 cP;
3. 85 cP;
4. 70 cP;
5. 52 cP.

EXAMPLE 2

The above experiment was repeated except that hydration was performed simultaneously with milling in a ball mill in the presence of 0.25% acetic acid. The viscosity of the resulting slurry at a shear rate of 139 $sec^{-1}$ was 95 cP.

EXAMPLE 3

A 6.00 kg quantity of –100 micron magnesia was added in 100 g portions, to 8.00 kg of hot tap water (81° C.) at a rate that maintained the temperature of the hydrating slurry at 95–100° C. The hydration reaction was allowed to proceed for 60 mins. The chemical composition of the magnesia feedstock was as follows: MgO-94.36%, $SiO_2$-0.68%, $Al_2O_3$-0.05%, CaO-2.20%, $Fe_2O_3$-0.04%, $MnO_2$-0.094%, LOI(loss on ignition)-2.97%.

After 60 minutes, the slurry was sampled, and the solids content adjusted to approximately 60 wt % by the addition of water lost in the form of steam. The slurry was then split into two approximately 7 kg portions, both of which were milled at 54 rpm for approximately 1 h in a 20 L ceramic ball mill containing 12 kg of ceramic balls of approximately 20–30 mm diameter. After milling, both portions were recombined and intimately mixed. The resulting slurry contained 58 wt % solids and had a $d_{50}$ particle size of 8.9 $\mu$m.

The slurry was then split into 25×400 g portions contained in 375 mL glass jars. These samples were treated with a range of reagents. The viscosities of the treated samples were measured over a period of time. The results are shown in Table 1.

EXAMPLE 4

A 3.00 kg quantity of –100 micron magnesia was added in a single addition, to 4.10 kg of hot tap water at 84° C. This magnesia was slower to hydrate and harder to grind than that used in Example 3, requiring longer milling and hydration times. The hydrating system was externally heated to maintain a temperature of between 90–100° C. The hydration reaction was allowed to proceed for three hours. The chemical analysis of this magnesia was: 91.16% MgO, 1.30% $SiO_2$, 0.08% $Al_2O_3$, 1.76% CaO, 0.38% $Fe_2O_3$, 0.06% $MnO_2$, LOI 5.44%.

After three hours, the slurry was sampled, and the solids content adjusted to approximately 60 wt % by the addition of water lost in the form of steam. The slurry was then milled at 54 rpm for approximately 3 h in a 20 L ceramic ball mill containing 12 kg of ceramic balls of approximately 20–30 mm diameter. The resulting slurry contained 59 wt % solids and had a do particle size of 10.3 $\mu$m. After milling, the slurry was split into 400 g portions contained in 375 mL glass jars. These samples were treated with a range of reagents. The viscosity of the treated samples were measured over a period of time. The results are shown in Table 2.

It will be appreciated from a review of Tables 1–2 that the property of viscosity stability is independent of sedimentation stability and these two parameters in some cases are not mutually dependent.

EXAMPLE 5

(This Example was performed on the plant depicted in FIG. 1 above.)

Twenty-eight×25 kg bags of nominally minus 20 mm MgO were manually charged to the hopper 10 mounted atop a vibrating feeder 11 and then directed into the ball mill 13.

The measured composition of the magnesia used in this example was as follows:

MgO 94.4%, $SiO_2$ 0.7%, $Al_2O_3$ 0.05%; CaO 2.2%; $Fe_2O_3$ 0.04%; MnO 0.09%; LOI 3.0%.

The rate of MgO addition to the ball mill 13 was controlled by adjusting the vibrating feeder 11. MgO was added over 2.41 hours (5 kg/min). Cold water was also introduced into the mill 13. The rate of water addition was regulated using an adjustable flowmeter. 750 L of water was added to the ball mill at a flow rate of approximately 4.8 L/min over a period of 2.6 hrs. The solids content of the MgO slurry discharged from the ball mill 13 was in the range of 50 to 60 wt % solids. During the first grinding stage in the ball mill 13, a rise in slurry temperature from 14 to 22° C. was observed. Therefore the extent of hydration in the ball mill 13 was believed to have been negligible.

The discharge from the ball mill 13 was pumped to the screen assembly 27 fitted with a 1000 $\mu$m screen. Oversize solid material (+1000 $\mu$m) from the screen was returned to the ball mill inlet whilst the undersize material was routed to the hydration tank/holding tank 35. After addition of the MgO to the ball mill 13 was completed, 10 minutes was allowed for the last of the MgO slurry to pass through the mill and into the hydration tank/holding tank 35. At this time, the water feed to the mill 13 was cut and the ball mill 13 turned off.

Magnesia slurry that passed through the screen was routed to the hydration tank/holding tank 35 at a flow rate of approximately 5 L/min. The hydration tank 35 contained 450 L of water heated to a temperature of approximately 80–85° C. The water in the hydration tank was heated using a 15 kw immersion heater. Sixty minutes after the first MgO slurry addition, the temperature of the slurry in the tank increased to 90° C. (as a result of hydration) and the immersion heater was turned off. Slurry boiling was avoided during the hydration reaction by the low and controlled rate of MgO slurry addition. After the final addition of MgO slurry, 15–30 minutes were allowed for the hydration of any residual MgO and the addition of acetic acid. Acetic acid was added at the dosing rate of 2 mL/kg slurry (3.3 L/1100 L slurry (SG of slurry was 1.5) in order to prevent slurry thickening during subsequent milling.

After hydration, the slurry was cycled to the attrition mill 39. Milling was conducted for two hours with the attritor on high speed. The average residence time for the slurry in the mill was approximately 6 min and the final particle size distribution of the bulk slurry was $d_{90}$ approximately 25 μm, $d_{50}$ approximately 7 μm. After milling, the slurry was pumped to a container for storage. The final solids content of the slurry was measured at 61.5 wt %. The slurry developed a yield stress upon standing (gelled) which was easily refluidised with minimal agitation. The viscosity of the slurry was measured as 85 cP at a shear rate of 139 sec$^{-1}$. The slurry in both the fluid and gel form was non-settling.

After refluidising, the slurry regelled in approximately 5 min, to the extent that a 375 cm$^3$ jar charged with 500 g of slurry could be inverted without the slurry flowing. After 15 days, the slurry properties remained essentially unchanged, i.e. it could be refluidised with minimal agitation, gelled in approximately 5 min and had a viscosity of approximately 85 cP at a shear rate of 139 sec$^{-1}$.

EXAMPLE 6

This example was performed on the plant depicted in FIG. 2 above using the same magnesia feedstock as in Example 5. 1150 L of $H_2O$ was initially heated to 84° C. in the hydration tank 12. 725 kg of nominally minus 100 μm caustic calcined MgO was added to the stirred, hot water over 160 mins. The slurry started to boil after only 20 mins, and continued to boil smoothly throughout the addition of MgO. Approximately 675 kg of MgO was added over the first 2 hours but then the slurry became very thick and the MgO addition rate was reduced. After MgO addition was completed, the slurry was so thick that the stirrer was ineffective. Addition of acetic acid was commenced and after approximately 2 L of reagent had been added, the reactor stirrer became effective in mobilising the slurry. A total of 3.3 L of acetic acid (2 L/tonne) was added over 20 mins. The slurry was then stirred for a further 60 mins before being transferred to the holding tank via the mill. The slurry was then recirculated through the ball mill and back to the holding tank for a further 7 hours, giving a total grinding time of 8 hours 15 mins and an average "time in mill" of approximately 22 mins. 1 L of acetic acid and 15 kg of sugar were then added and mixed before the slurry was transferred to a container for storage. The final SG and % solids of the slurry were measured at 1.52 and 59.5 wt % respectively. The slurry had a $d_{50}$ particle size of 13 μm and a viscosity of 45 cP at a shear rate of 139 sec$^{-1}$. This stored slurry, which was now very thin and fluid, was observed after 1, 4 and 24 days. The slurry remained thin and fluid over this period.

EXAMPLE 7

A magnesium feedstock having the following chemical composition on a w/w basis: MgO 92.83%, $SiO_2$ 0.87%, $Al_2O_3$ 0.06%, CaO 2.72%, $Fe_2O_3$ 0.07%, MnO 0.09% with a LOI of 3.37% was hydrated to form a magnesium hydroxide slurry as described below. The magnesia feedstock was passed through a roller to reduce the particle size to less than 1 mm prior to hydration.

The hydration reaction was conducted in a 10 liter un-insulated stainless-steel vessel. The slurry was stirred with a paddle that effectively prevented solids from settling and forming a sediment. However, no emphasis was placed on homogenising the mixture. A 3.00 kg quantity of the magnesia sample was added, in a single addition, to 4.1 kg of hot (80–100° C.) tap water. The hydration was allowed to proceed for 1 hour during which time the temperature was 90–100° C. After hydration the slurry was weighed and water added to make up for that lost to evaporation and so adjust the solids content to approximately 60% w/w.

The still warm slurry was transferred to a 20 liter ceramic ball mill charged with 12.00 kg of ceramic balls of approximately 20–30 mm diameter. The mill was then assembled and rolled at 54 rpm for 4.0 hours. After milling, the slurry was sampled and the solids content was determined to be 60.1% w/w.

To a 400 g quantity of the slurry, a 20% water solution of a sodium polyacrylate polymer was added in increments and the viscosity measured after each increment at 139 sec$^{-1}$ shear rate. The pH was also measured at these times. For comparison purposes, similar volumes of water were also added to a 400 g quantity of the slurry and the viscosities measured at 139 sec$^{-1}$ shear rate.

The sodium polyacrylate used for this Example was commercially available under the trade name of DISPEX N40 and is described by the supplier as a low molecular weight, anionic, water soluble polymer. It is reported by the supplier to be effective over a pH range of 5–14 up to a temperature of 100° C. without any deterioration in dispersion efficiency. The chemical composition can be represented by the formula $[CH_2CHCOONa]_n$.

Prior to the addition of the polymer, the slurry was a fluid slurry with a viscosity of 440 cP at 139 sec$^1$ with a tendency to gel and with no evidence of settling. With the addition of the polymer, the slurry thickened markedly to form a thick paste which could only just be moved with vigorous shaking. With the further addition of polymer, the slurry thinned to a viscosity similar to that of the initial slurry. Further additions of polymer thinned the slurry more. The gelling characteristic of the slurry appeared to have been lessened by the addition of the polymer. The volumes of polymer and the resulting viscosities are shown in Table 3.

The addition of similar volumes of water to the slurry resulted in a gradual decrease in slurry viscosity. The volumes of water added and the resulting viscosities are shown in Table 3.

EXAMPLE 8

A magnesium hydroxide slurry was prepared using the same feedstock and procedure described for Example 7. To 500 g splits of this slurry were added separately the following reagents: 12.0 mL and 36.0 mL of the polymer used in Example 7. A third sample was prepared by the addition of 0.8 mL of acetic acid to 400 g of the slurry. The reactivities of these slurries were determined for comparison with untreated slurry and approximately –100 micron powdered magnesia.

The reactivities were measured by the dissolution rate at pH 9.0 using 2 mol/L hydrochloric acid. This method involves measuring the rate at which the acid must be added to a stirred suspension containing the equivalent of 1.0 g of MgO in 800 mL of water in order to maintain the suspension at a constant pH of 9.0.

A quantity of magnesia or magnesium hydroxide slurry equivalent to 1±0.01 g was weighed into a dry 1000 mL beaker. An 800 mL quantity of water was added and stirred for 1 min to disperse the sample. Titration was commenced and the volume of acid recorded as a function of time. The shape of the resulting plots, shown in FIG. 7, indicated the differences in reactivities between the samples.

Figure 7:
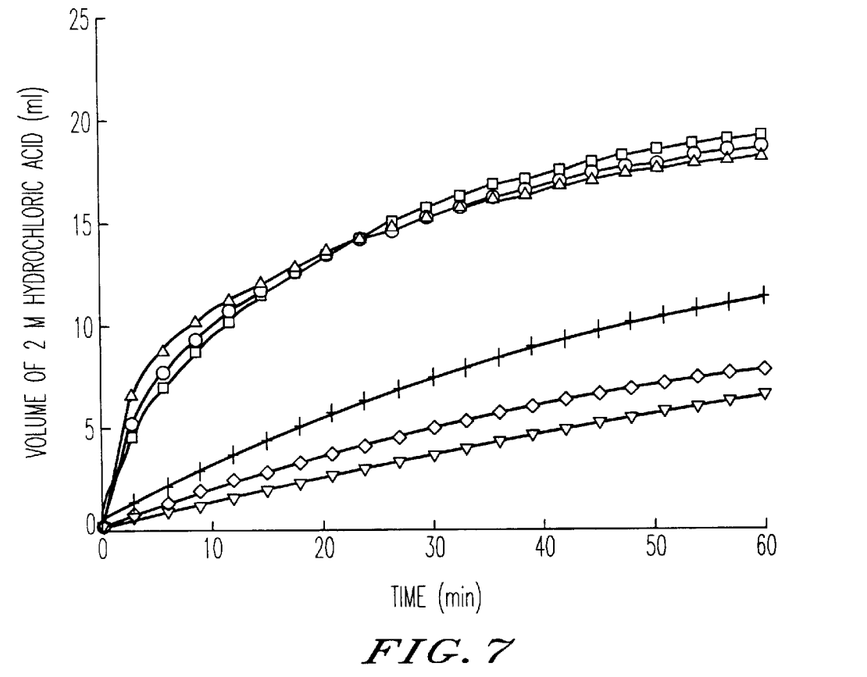
FIG. 7 is a graph showing the reactivity of the slurry of the invention with the addition of hydrochloric acid and also in the presence of polyacrylate.

The slurry without reagent, that with acetic acid, and the magnesia powder were found to have essentially the same reactivities. However, the slurries with polymer added were very much less reactive but similar to each other. Thirty minutes stirring followed by ultrasonic agitation of a slurry containing 12.0 mL of polymer, for 5 minutes prior to testing, was found to improve the reactivity of that slurry only slightly as shown in FIG. 7.

EXAMPLE 9

The experiments reported in detail in Example 7 and Example 8 were carried out with slurries formed from another magnesia feedstock having the following chemical composition on a w/w basis: MgO 93.62%, $SiO_2$ 1.12%, $Al_2O_3$ 0.10%, CaO 1.64%, $Fe_2O_3$ 0.35%, MnO 0.06%, with an LO1 2.99%. Similar behaviour was observed in regard to slurries derived from this magnesia feedstock as was noted for slurries derived from magnesia feedstock used in Example 7 and Example 8. The quantities of polymer used were 5.0 mL and 15.0 mL. The results are given in Table 4 and FIG. 8.

EXAMPLE 10

A magnesium hydroxide slurry was prepared using the same feedstock and procedure described in Example 7. The reagents shown in Table 5 were added in the amounts shown to 400 g samples of the slurry. It is noted that reagents which have an alkali metal cation, such as sodium carbonate, sodium acetate, sodium hydroxide and sodium chloride, had the undesirable property of immediately thickening the slurry. In contrast, the other reagents which comprised calcium hydroxide, calcium acetate, calcium chloride, aluminium chloride and acetic acid thinned the slurry.

EXAMPLE 11

A magnesium hydroxide slurry was prepared using the same feedstock and procedure described for Example 9. The same reagents as used in Example 10 were added to 400 g samples of this slurry and similar results were obtained. These results are shown in Table 6.

EXAMPLE 12

A magnesium hydroxide slurry was prepared using the same feedstock and procedure described for Example 9. The reagents aluminium nitrate, barium nitrate, calcium nitrate and ferric nitrate were added to 400 g samples of the slurry. It was noted that all of these reagents thinned the slurry. The results are recorded in Table 7.

TABLE 1

EXAMPLE 3 results
Sample size = 400 g

| REAGENT | TREATMENT DETAILS | OBSERVATIONS - AFTER 1 DAY | OBSERVATIONS - AFTER 24 DAYS | VISCOSITY (cP) at 139 sec$^{-1}$ 1 day | 24 days |
|---|---|---|---|---|---|
| no treatment | | thick, pseudoplastic slurry | thick paste | 400 | 1300 |
| HCl | 1 mL, (35%) | very thin fluid, non settling | thick but fluid when stirred | 100 | 266 |
| $HNO_3$ | 0.6 mL, (60%) | very thin fluid, non settling | thick but fluid when stirred | 190 | 660 |
| $H_2SO_4$ | 0.2 mL, (98%) | thick paste | thick paste | n.d | n.d |
| $HClO_4$ | 0.8 mL, | thin and fluid, non settling | thick but fluid when stirred | 290 | 500 |
| $H_3PO_4$ | 0.2 mL | thick paste | thick paste | n.d | n.d |
| $MgCl_2$ | 0.7% w/w* | very thin fluid, non settling | thick but fluid when stirred | 115 | 400 |
| Glucose | 2.0% w/w | very thin fluid, non settling | thin fluid-non settling | 71 | 94 |
| Sucrose | 4.0% w/w | thin fluid, non settling | thin fluid-non settling | 170 | 280 |
| Mannitol | 4.0% w/w | thin fluid, non settling | thin fluid-non settling | 88 | 80 |
| Butanol | 1 mL | thick fluid, non settling | thick paste | 360 | n.d |
| Heptanol | 1 mL | thick fluid, non settling | thick paste | 420 | n.d |
| Golden Syrup | 28% w/w | thin fluid, non settling | thin fluid-non settling | n.a | n.a |
| Glycerol | 2 mL | no effect | thick fluid-non settling | n.a | n.a |
| no treatment | | thick, pseudoplastic slurry | thick paste | 400 | 1300 |
| Formic acid | 0.4 mL | very thin fluid, non settling | thin fluid-non settling | 47 | 82 |
| Acetic acid | 0.4 mL | very thin fluid, non settling | thin fluid-non settling | 36 | 66 |
| Propionic acid | 0.6 mL | very thin fluid, non settling | thin fluid-non settling | 30 | 78 |
| 2-ethyl butyric acid | 0.6 mL | very thin fluid, frothing/curdling | thin fluid, frothing/curdling | 38 | 86 |
| Octanoic acid | 0.8 mL | thin fluid, frothing/curdling | thick fluid, frothing/curdling | 215 | 720 |
| Oleic acid | 0.6 mL | thicker fluid | thick paste | n.d | n.d |
| Magnesium acetate | 0.5% w/w | very thin fluid, non settling | thin fluid-non settling | 25 | 90 |
| Mandelic acid | 1.0% w/w | very thin fluid, non settling | thick but fluid when stirred | 53 | 250 |
| Lactic acid | 0.8 mL | very thin fluid, non settling | thin and fluid-non settling | 65 | 50 |
| Tartaric acid | 0.5% w/w | thick paste | thick paste | n.d | n.d |
| Citric acid | 11% w/w | thick fluid | thick but fluid when stirred | n.d | n.d |

TABLE 2

EXAMPLE 4 results
Sample size = 400 g

| REAGENT | TREATMENT DETAILS | OBSERVATIONS - AFTER 1 DAY | OBSERVATIONS - AFTER 24 DAYS | VISCOSITY (cP) at 139 sec$^{-1}$ 1 day | VISCOSITY (cP) at 139 sec$^{-1}$ 24 days |
|---|---|---|---|---|---|
| no treatment | | thick fluid, non-settling | thick paste | 410 | n.d |
| acetic acid | 0.5 mL glacial | very thin fluid, settles quickly | very thin fluid, settles quickly | <20 | <20 |
| sucrose | 2% w/w | very thin fluid, non-settling | thick fluid, non-settling | <20 | 1250 |
| Ca(OH)$_2$ | 2% w/w | thin fluid, non-settling | thin fluid, non settling | 70 | 62 |
| Ca(OH)$_2$ plus acetic acid | 2% w/w Ca(OH)$_2$ + 0.5 mL acetic acid glacial | very thin fluid, non-settling | very thin fluid, non settling | 46 | 50 |
| Ca(OH)$_2$ plus sucrose | 2% w/w Ca(OH)$_2$ + 2% sucrose | thick fluid, non settling | thick fluid, non-settling | 410 | 400 |

TABLE 3

Variation of viscosity with polymer addition for Example 7

| VOLUME 20% POLYMER (mL) | VISCOSITY AT 139 sec$^{-1}$ SHEAR (cP) | VOLUME OF WATER (mL) | VISCOSITY AT 139 s$^{-1}$ SHEAR (cP) |
|---|---|---|---|
| 0 | 440 | 0 | 440 |
| 1 | >1400 | | |
| 5 | >1400 | 5 | 280 |
| 6 | >1400 | | |
| 8 | >1400 | | |
| 10 | 375 | 10 | 200 |
| 12.5 | 370 | | |
| 15 | 282 | | |
| 20 | 244 | 20 | 135 |
| 25 | 210 | | |
| 30 | 193 | 30 | 98 |
| 35 | 176 | | |
| 40 | 160 | 40 | 74 |
| 50 | 144 | | |

TABLE 4

Variation of viscosity with polymer addition for Example 9

| VOLUME 20% POLYMER (mL) | VISCOSITY AT 139 sec$^{-1}$ SHEAR (cP) | VOLUME OF WATER (mL) | VISCOSITY AT 139 s$^{-1}$ SHEAR (cP) |
|---|---|---|---|
| 0 | 1100 | 0 | 1360 |
| 1 | >1400 | | |
| 3 | 83 | | |
| 5 | 51 | 5 | 1210 |
| 7 | 55 | | |
| 10 | 61 | 10 | |
| 15 | 71 | | 880 |
| 20 | 72 | | |
| 25 | | 25 | 672 |
| 30 | 71 | | |

TABLE 5

Effects of the addition of various reagents in Example 10

| REAGENT ADDED | (% mol/mol Mg(OH)$_2$) | VISCOSITY @ 139 sec$^{-1}$ SHEAR INITIALLY | AFTER 28 DAYS | OBSERVATIONS |
|---|---|---|---|---|
| No addition | n.a. | 465 | n.d. | Mobile paste, fluid on agitation |
| Calcium hydroxide | 0.4 | 110 | 80 | Pseudoplastic, thin gelling fluid apparent after 30 min |
| Calcium acetate | 0.15 | 81 | 80 | Thin fluid immediately, no evidence of settling or gelling |
| Sodium carbonate | 0.05 | n.d. | n.d. | Thickened immediately to a thick paste |
| Sodium acetate | 0.10 | n.d. | n.d. | Thickened immediately to a thick paste |
| Sodium hydroxide | 0.10 | n.d. | n.d. | Thickened immediately to a thick paste |
| Sodium chloride | 0.10 | n.d. | n.d. | Thickened immediately to a thick paste |
| Calcium chloride | 0.05 | 420 | 550 | Pseudoplastic, thickish fluid upon agitation |
| Aluminium chloride | 0.10 | 270 | 230 | Pseudoplastic, thin fluid upon agitation |
| Hydrochloric acid | 0.20 | 560 | 750 | Mobile paste, thick fluid upon agitation |
| Acetic acid | 0.20 | 65 | 76 | Pseudoplastic, thin fluid on agitation |

TABLE 6

Effects of the addition of various reagents in Example 11

| | REAGENT ADDED (% mol/mol Mg(OH)$_2$) | VISCOSITY @ 139 sec$^{-1}$ SHEAR INITIALLY | VISCOSITY @ 139 sec$^{-1}$ SHEAR AFTER 28 DAYS | OBSERVATIONS |
|---|---|---|---|---|
| No addition | n.a. | 1760 | 2700 | Thick paste |
| Calcium hydroxide | 0.50 | 300 | 1630 | Thin pseudoplastic fluid apparent 30 min after addition |
| Calcium acetate | 0.20 | 49 | 43 | Thin fluid immediately, no evidence of settling or gelling |
| Sodium carbonate | 0.05 | n.d. | n.d. | Remained a thick paste |
| Sodium acetate | 0.10 | n.d. | n.d. | Remained a thick paste |
| Sodium hydroxide | 0.10 | n.d. | n.d. | Remained a thick paste |
| Sodium chloride | 0.10 | n.d. | n.d. | Remained a thick paste |
| Calcium chloride | 0.10 | <20 | 25 | Thin pseudoplastic fluid apparent 30 min after addition |
| Aluminium chloride | 0.10 | <20 | <20 | Thin pseudoplastic fluid apparent 30 min after addition, no evidence of settling |
| Hydrochloric acid | 0.20 | <20 | 39 | Thin non-gelling fluid, settles slightly |
| Acetic acid | 0.20 | <20 | <20 | Very thin non-gelling fluid, settles significantly |

TABLE 7

Effects of the addition of various reagents in Example 12

| | REAGENT ADDED (% mol/mol Mg(OH)$_2$) | VISCOSITY @ 139 sec$^{-1}$ SHEAR INITIALLY | VISCOSITY @ 139 sec$^{-1}$ SHEAR AFTER 7 DAYS | OBSERVATIONS |
|---|---|---|---|---|
| No addition | n.a. | n.d. | n.d. | Thick paste |
| Aluminium nitrate | 0.04 | <20 | 33 | Very thin non-gelling fluid settles slightly, however, sediment is easily dispersed |
| Barium nitrate | 0.04 | 38 | 55 | Thin non-gelling, non-settling fluid |
| Calcium nitrate | 0.05 | 43 | 65 | Thin non-gelling, non-settling fluid |
| Ferric nitrate | 0.04 | <20 | 40 | Very thin non-gelling fluid settles slightly, however, sediment is easily dispersed |

LEGENDS

Table 1
   n.d—not determined, in view of the appearance of the product, the viscosity was obviously greater than 1000 cP at 139 sec$^{-1}$
   *—all % w/w based on weight of Mg(OH)$_2$
   n.a—not available Table 2
   n.d—not determined because, in view of the appearance of the product, the viscosity was obviously greater than 1000 cP at 139 sec$^{-1}$.

Figure 8:
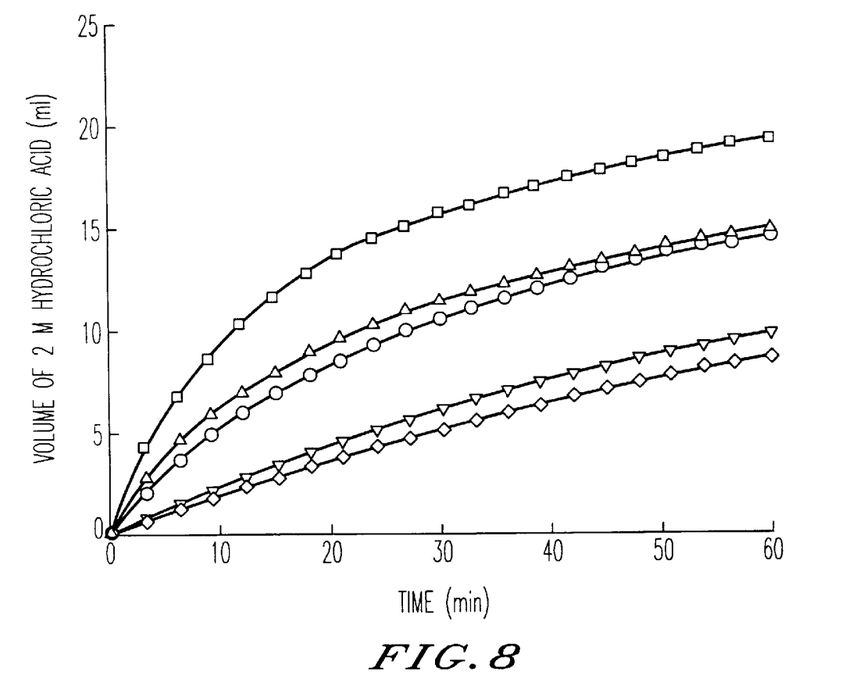
FIG. 8 is a similar graph as described above in regard to FIG. 7 in regard to a slurry of the invention prepared from a different magnesia feedstock to that utilised in FIG. 7.

Table 5
   n.a.—not applicable
   n.d.—not determined Table 6
   n.a.—not applicable
   n.d.—not determined Table 7
   n.a.—not applicable
   n.d.—not determined FIG. 7
Volume of 2M hydrochloric acid added as a function of time to maintain 9.0 pH for Example 8.
   —□— Magnesia powder
   —○— Slurry—no reagent added
   —△— Slurry with acetic acid
   —▽— Slurry with minimum Dispex N40 needed for dispersion
   —†— Slurry with minimum Dispex N40 and additional prior agitation FIG. 8
Volume of 2M hydrochloric acid added as a function of time to maintain 9.0 pH for Example 9.
   —□— Magnesia powder
   —○— Slurry—no reagent added
   —△— Slurry with acetic acid
   —▽— Slurry with minimum Dispex N40 needed for dispersion
   —◇— Slurry with three times minimum Dispex N40 needed for dispersion.

We claim:
1. A magnesium hydroxide slurry, comprising:
   (i) between about 40–80% of a solids content based on the weight of the slurry with the balance being water; and
   (ii) between about 0.01–5.0 wt % of at least one viscosity modifying agent or dispersant based on the weight of the slurry selected from the group consisting of:

(1) inorganic acids having a molecular weight less than 130 amu, and inorganic salts thereof excluding $H_2SO_4$, $H_3PO_4$, silicic acid and salts thereof having an alkali metal as a sole cation;

(2) carboxylic acids having a molecular weight of less than 200 amu optionally containing one or more hydroxyl groups, and salts thereof excluding salts having alkali metal as a sole cation;

(3) polyhydric alcohols, and carbohydrates containing two or more hydroxyl groups and having a molecular weight of less than 500 amu; and (4) alkaline earth oxides, hydroxides, and a combination thereof; said slurry being sedimentation stable for at least 7 days without substantial agitation; and maintaining a viscosity of less than 1000 cP at a shear rate of 139 $sec^{-1}$ over a period of at least 7 days;

said slurry excluding polymeric viscosity modifying agents.

2. The magnesium hydroxide slurry of claim 1, comprising particle agglomerates of crystals wherein the agglomerates have a mean particle size of between 2–50 microns and wherein individual crystals included in said agglomerates have an upper limit of average crystal dimension of 0.2 micron as determined by X-ray Diffraction Line Broadening.

3. The magnesium hydroxide slurry of claim 2, wherein the crystals are of irregular shape.

4. The magnesium hydroxide slurry of claim 2, wherein the agglomerates have a $d_{50}$ of greater than 3 microns.

5. The magnesium hydroxide slurry of claim 4, wherein the agglomerates have a $d_{50}$ of greater than 6 microns.

6. The magnesium hydroxide slurry of claim 2, wherein the upper limit of the average crystal dimension is less than 0.1 micron.

7. The magnesium hydroxide slurry of claim 6, wherein the upper limit of the average crystal dimension is less than 0.05 micron.

8. The magnesium hydroxide slurry of claim 1, wherein the solids content is greater than 60 wt %.

9. The magnesium hydroxide slurry of claim 8, wherein the solids content is between 60–70 wt %.

10. The magnesium hydroxide slurry of claim 1, wherein the total amount of $Mg(OH)_2$ plus $Ca(OH)_2$ has a value greater than 40 wt %.

11. The magnesium hydroxide slurry of claim 10, having a Mg:Ca ratio greater than 4:1.

12. The magnesium hydroxide slurry of claim 1, wherein the amount of solids other than $Mg(OH)_2$ is less than 10 wt %.

13. The magnesium hydroxide slurry of claim 1, wherein the amount of viscosity modifying agent or dispersant is between 0.5 and 3.0 wt %.

14. The magnesium hydroxide slurry of claim 1, wherein the viscosity modifying agents of group (1) are selected from the group consisting of HCl, $HNO_3$, $HClO_4$ and aluminum, ferric, magnesium, calcium and barium salts thereof.

15. The magnesium hydroxide slurry of claim 1, wherein the viscosity modifying agents of group (2) are selected from the group consisting of formic acid, acetic acid, propionic acid and butyric acid and the salts thereof.

16. The magnesium hydroxide slurry of claim 15, wherein the salts are calcium acetate, magnesium acetate and mixtures thereof.

17. The magnesium hydroxide slurry of claim 15, wherein the viscosity modifying agent is acetic acid.

18. The magnesium hydroxide slurry of claim 1, wherein viscosity modifying agents of group (3) are selected from the group consisting mannitol, mono-, di- and trisaccharides, and waste products containing sugar-based compounds.

19. The magnesium hydroxide slurry of claim 18 wherein said viscosity modifying agents are selected from the group consisting of sucrose and lactose.

20. The magnesium hydroxide slurry of claim 1, wherein viscosity modifying agents of group (4) are selected from the group consisting of calcium oxide, calcium hydroxide, and mixtures thereof.

21. The magnesium hydroxide slurry of claim 1, wherein the viscosity is less than 300 cP.

22. The magnesium hydroxide slurry of claim 1, wherein the viscosity is less than 100 cP.

23. The magnesium hydroxide slurry of claim 1, having a settling rate of less than 5% of total slurry volume in 30 days with less than 1% sediment.

24. The magnesium hydroxide slurry of claim 1, wherein the viscosity of the slurry does not increase to a value greater than 1000 cP at a shear rate of 130 $sec^{-1}$ over a period of at least 14 days.

25. A process for producing a magnesium hydroxide slurry, comprising:

(i) subjecting calcined magnesia of a particle size of about 25 mm or less to a first particle reduction zone wherein said calcined magnesia is mixed with water and ground;

(ii) passing said finely divided material through a screening means to ensure passage therethrough of finely divided magnesia having a particle size of about 2 mm or less and returning oversize magnesia particles to said first reduction zone;

(iii) hydrating said finely divided magnesia in a hydration zone wherein said finely divided magnesia is mixed with water under agitation and heat so as to produce a magnesium hydroxide slurry having at least 80% hydration;

(iv) passing said slurry through a second particle reduction zone so as to produce slurry particles wherein 90% of said slurry particles have a size less than 50 microns;

(v) adding a viscosity modifying agent prior to or during steps (i), (ii), (iii), or (iv) so as to ensure a maximum viscosity of 1000 cP; and (vi) obtaining after step (v) as a final product stable, pumpable, magnesium hydroxide slurries having a solids content of at least 40%, and excluding polymeric viscosity modifying agents;

said viscosity modifying agent being selected from the group consisting of:

(1) inorganic acids having a molecular weight less than 130 amu, and inorganic salts thereof excluding $H_2SO_4$, $H_3PO_4$, silicic acid and salts thereof having an alkali metal as a sole cation;

(2) carboxylic acids having a molecular weight of less than 200 amu optionally containing one or more hydroxyl groups and salts thereof excluding salts having alkali metal as a sole cation;

(3) polyhydric alcohols, and carbohydrates containing two or more hydroxyl groups and having a molecular weight of less than 500 amu; and (4) alkaline earth oxides, hydroxides and a combination thereof.

26. The process for producing a magnesium hydroxide slurry of claim 25, wherein slurry particles obtained from step (iv) are recycled back to the second particle reduction zone in a loop or back to the hydration zone which functions as a holding tank.

27. A process for producing a magnesium hydroxide slurry, comprising:
(i) continuously feeding magnesia to a hydration zone wherein the slurry is subjected to a continual agitation;
(ii) hydrating said magnesia in the hydration zone under agitation and heat so as to produce a magnesium hydroxide slurry having at least 80% hydration;
(iii) adding a viscosity modifying agent prior to or during steps (i) or (ii) so as to ensure a maximum viscosity of 1000 cP; and
(iv) obtaining as a final product stable, pumpable magnesium hydroxide slurries having a solids content of at least 40%, and excluding polymer viscosity modifying agents;
said viscosity modifying agent being selected from the group consisting of:
(1) inorganic acids having a molecular weight less than 130 amu, and inorganic salts thereof excluding $H_2SO_4$, $H_3PO_4$, silicic acid and salts thereof having an alkali metal as a sole cation;
(2) carboxylic acids having a molecular weight of less than 200 amu optionally containing one or more hydroxyl groups and salts thereof excluding salts having alkali metal as a sole cation;
(3) polyhydric alcohols, and carbohydrates containing two or more hydroxyl groups and having a molecular weight of less than 500 amu; and
(4) alkaline earth oxides, hydroxides and a combination thereof.

28. The process for producing a magnesium hydroxide slurry of claim 27, wherein after step (ii) the slurry is passed through a particle reduction zone so as to produce slurry particles wherein 90% of said slurry particles have a size of less than 50 microns.

29. The process for producing a magnesium hydroxide slurry of claim 28, wherein said slurry particles are recycled back to the particle reduction zone in a loop or back to the hydration zone which functions as a holding tank.

30. The process for producing a magnesium hydroxide slurry of claim 29, wherein after passage through the particle reduction zone, the slurry which is relatively thin is transferred to a holding zone which is in communication with the particle reduction zone and the slurry is continuously circulated between the holding zone and the particle reduction zone.

31. The process for producing a magnesium hydroxide slurry of claim 27, wherein the viscosity modifying agent is added to the slurry after hydration or when the slurry has become relatively thick in the hydration zone.

32. A process for producing a stable, pumpable slurry of magnesium hydroxide comprising adding to a slurry of magnesium hydroxide a viscosity modifying agent selected from the group consisting of:
(1) inorganic acids having a molecular weight less than 130 amu, and inorganic salts thereof excluding $H_2SO_4$, $H_3PO_4$, silicic acid and salts thereof having an alkali metal as sole cation;
(2) carboxylic acids having a molecular weight of less than 200 amu optionally containing one or more hydroxyl groups and inorganic salts thereof excluding salts having alkali metal as a sole cation;
(3) polyhydric alcohols, and carbohydrates containing two or more hydroxyl groups and having a molecular weight less than 500 amu; and
(4) alkaline earth oxides, hydroxides, and mixtures thereof; and
wherein polymeric viscosity modifying agents are excluded.

33. The process as claimed in claim 32, wherein the amount of viscosity modifying agent which is added to the slurry is between 0.5 and 3.0 wt %.

34. The process of claim 32, wherein viscosity modifying agents selected from group (1) are HCl, $HNO_3$, $HClO_4$ and aluminum, ferric, magnesium, calcium and barium salts thereof.

35. The process of claim 32, wherein viscosity modifying agents of group (2) are selected from the group consisting of formic acid, acetic acid, propionic acid, butyric acid and the salts thereof.

36. The process of claim 35, wherein the salts are calcium acetate, magnesium acetate, and mixtures thereof.

37. The process of claim 32, wherein viscosity modifying agents of group (3) are selected from the group consisting of mannitol, mono-, di- and trisaccharides, and waste products containing sugar-based compounds.

38. The process of claim 37, wherein said viscosity modifying agent is selected from the group consisting of sucrose and lactose.

39. The process of claim 32, wherein viscosity modifying agents of group (4) are selected from the group consisting of calcium oxide, calcium hydroxide, and mixtures thereof.

* * * * *